Patented Feb. 5, 1924.

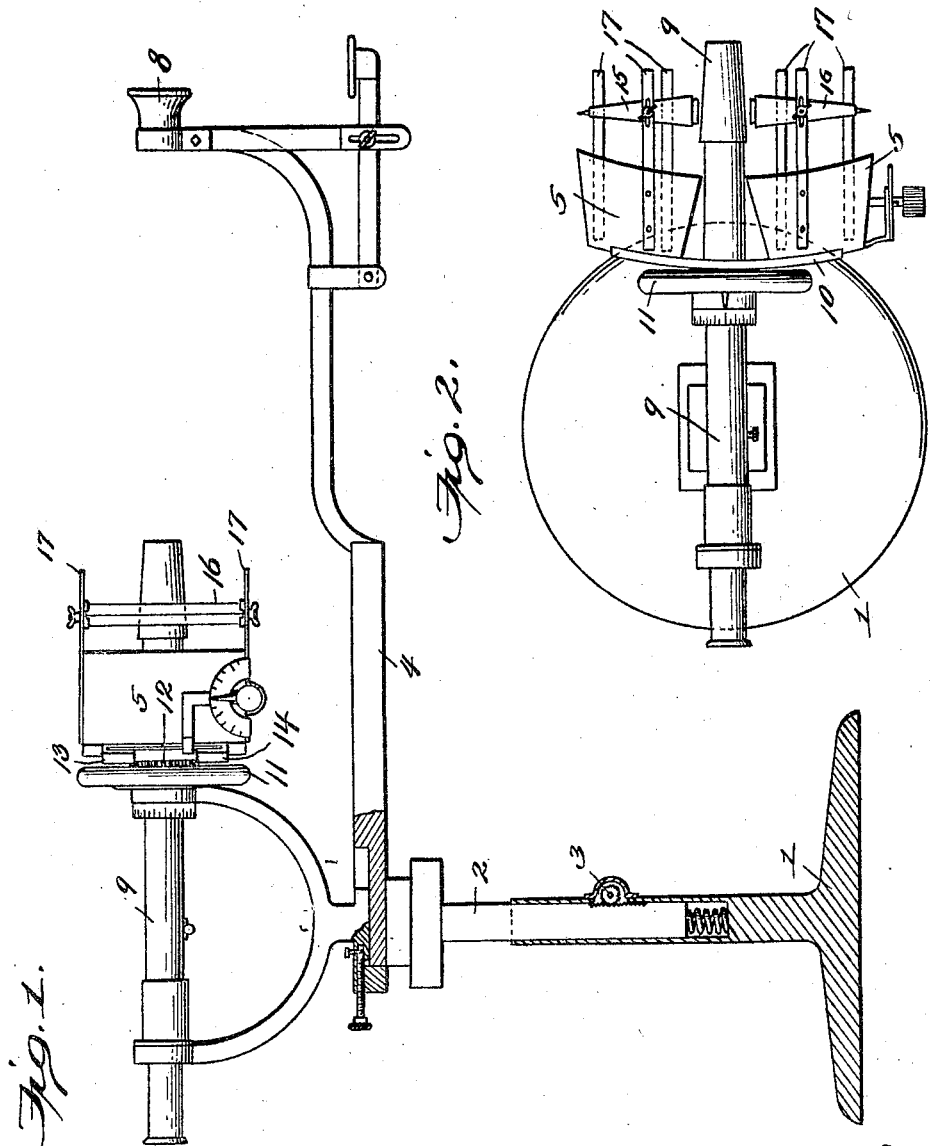

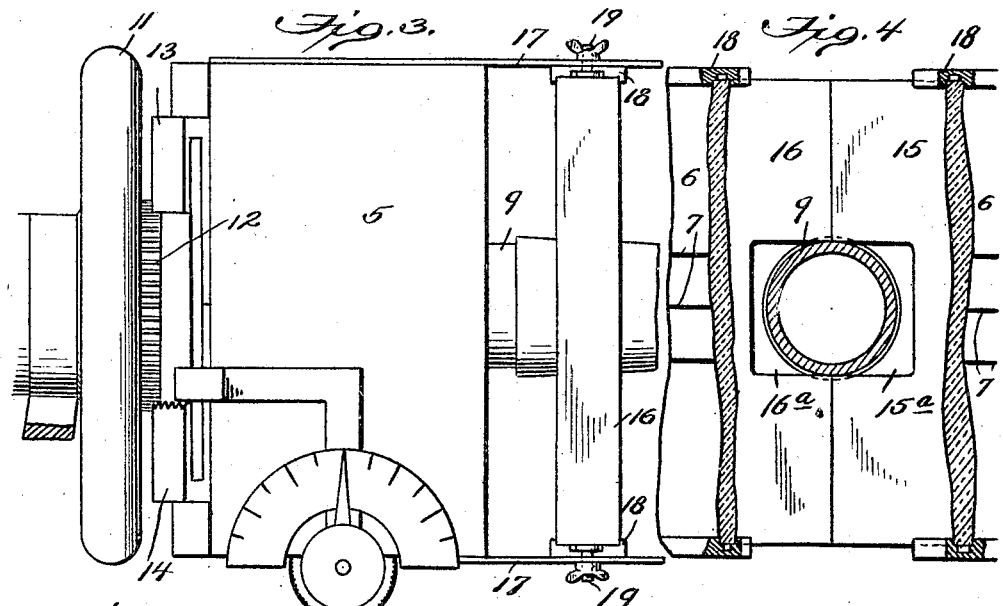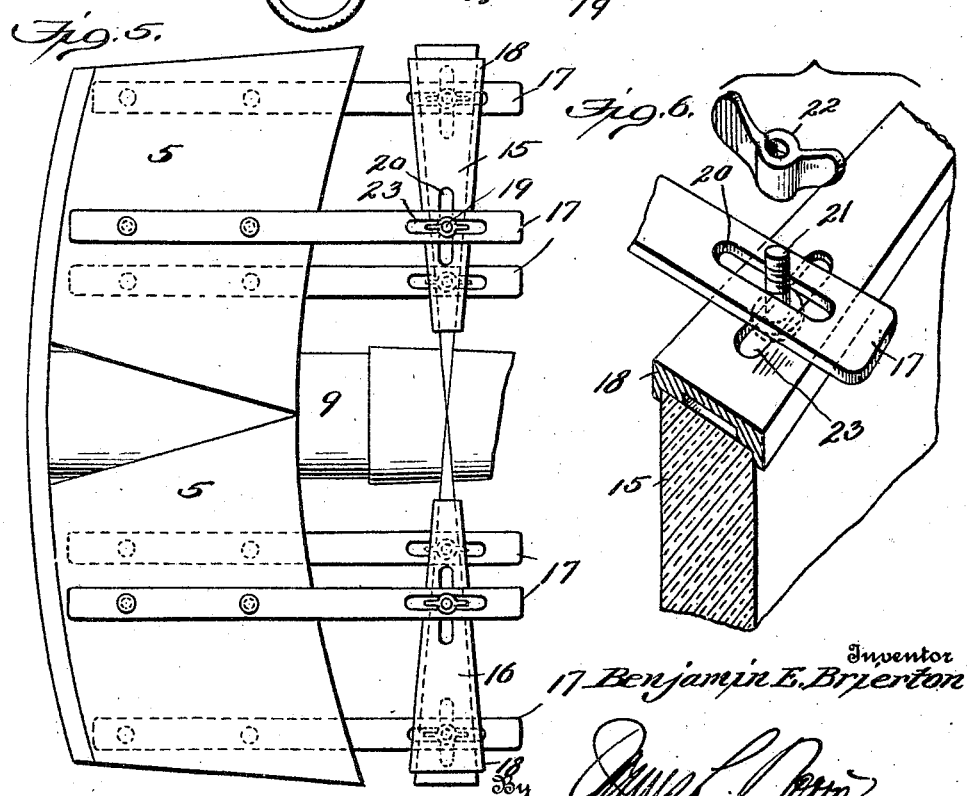

1,482,967

UNITED STATES PATENT OFFICE.

BENJAMIN E. BRIERTON, OF BIRMINGHAM, ALABAMA.

OPTOMETRICAL INSTRUMENT.

Application filed October 26, 1922. Serial No. 597,020.

*To all whom it may concern:*

Be it known that I, BENJAMIN E. BRIERTON, a citizen of the United States, residing at Birmingham, in the county of Jefferson and State of Alabama, have invented certain new and useful Improvements in Optometrical Instruments, of which the following is a specification.

The present invention relates to instruments of the kind used for examining the cornea of the eye to determine its refractive state and for measuring the extent of such refractive errors as may be present, instruments of this kind usually embodying a pair of mire-boxes, images from which are projected onto the corneal surface under examination, whence such images are reflected into a telescope or other optical device which suitably magnifies the images and renders them visible to the oculist or optician making the examination.

The primary object of the invention is to provide means which is applicable to the various types of instruments of the kind referred to and which is capable of increasing the field of examination of the corneal surface, so that a greater area of such surface can be examined and measured than has heretofore been practicable, such means in particular enabling the center or polar area and also the extreme peripheral area of the corneal surface to be examined and the nature and extent of such refractive errors as may be present determined and measured.

To these and other ends, the invention consists in certain improvements and combinations and arrangements of parts, all as will be hereinafter more fully described, the features of novelty being pointed out particularly in the claims at the end of the specification.

In the accompanying drawing:—

Figure 1 is a side elevation of one type of instrument adapted for the examination of the cornea of the eye and the measurement of such refractive errors as may be present, such instrument embodying the present invention;

Figure 2 is a top plan view of a part of the instrument shown in Figure 1, showing the present invention applied thereto;

Figure 3 is a side elevation, on an enlarged scale, of the mire-boxes of the instrument shown in Figure 1, the present invention being shown applied thereto;

Figure 4 is a front elevation of the middle portions of the mire-boxes as viewed from the front or from the right in Figure 3, the present invention being shown applied thereto;

Figure 5 is a top plan view of the mire-boxes showing the present invention applied thereto, and Figure 6 is a detail perspective view showing means which may be employed for securing each prism in proper adjusted position in front of its respective mire-box.

Similar parts are designated by the same reference characters in the several views.

The present invention is applicable generally to ophthalmometers and to all other instruments of the kind employing mire-boxes and suitable for use in examining the corneal surface of the eye and for the measurement of such surface to determine the extent of any refractive errors that may be present. The invention is shown in the present instance as applied to an instrument of the kind fully disclosed in the pending application, Serial No. 462,822, filed by myself and James H. Tinder, but it will be understood that the invention is not restricted in its use to instruments of that kind. Furthermore, the preferred embodiment of the invention is shown in the accompanying drawing and will be hereinafter described in detail, but it will be understood that the invention is not restricted to the precise construction shown, as equivalent constructions are contemplated and these will be included within the scope of the claims.

In the present instance, wherein the invention is shown applied to an instrument of the kind set forth in the pending application above referred to and to which application reference is made for a complete disclosure of such instrument, it will be sufficient to state that the instrument comprises a suitable stand or base 1. a column 2 adjustable vertically relatively to the stand by the pinion 3, a table 4 which is carried by the vertically adjustable column 2, a pair of mire-boxes 5 which are provided with lamps or other suitable means for illuminating their faces 6 which bear objects 7, an ophthalmostat 8 located in front of the mire-boxes for properly positioning the eye undergoing examination, and an iconoscope 9 through which the oculist or optician making the examination can observe the images of the objects on the mire-boxes which are reflected from the corneal surface of the eye under examination. The mire boxes 5 are located at opposite sides of the iconoscope 9 and they are mounted on a track 10 which, as shown, is arcuate in form so that the faces 6 of the mire-boxes, which are spherical and are adapted to be located concentrically with the axis of curvature of the corneal surface, may be maintained in such concentric position.

A hand wheel 11 is provided which has a gear 12 thereon meshing with racks 13 and 14 on the respective mire-boxes, rotation of the hand wheel acting to adjust the mire-boxes into different positions equidistantly and at opposite sides of the iconoscope. In operating the instrument of the kind shown, images of the objects on the translucent or transparent front faces 6 of the mire-boxes are projected onto the corneal surface of the eye positioned at the ophthalmostat and these images are reflected from the corneal surface into the iconoscope, so that they can be observed by the eye of the oculist or optician placed at the eye-piece of the iconoscope, the tests and measurements of the corneal surface for anomalous curvature and other defects being made as is fully described in the pending application above referred to. When the mire-boxes are brought together, so that their proximate edges are in touch, the images of the objects on the faces of the mire-boxes will be reflected from the area or zone of the corneal surface which is adjacent to or surrounds the center or polar area of such surface; and when the mire-boxes are relatively separated, the images of the objects will be reflected from the area or zone of the corneal surface which is toward or adjacent to the periphery thereof.

The present invention provides means which is applicable to instruments of the kind herein referred to and also to all other instruments of the same general class employing mire-boxes, by which the area of the corneal surface capable of examination and measurement is enlarged or extended, so that the center or polar area of the corneal surface, which is the most important, it being used in direct vision and also the outer peripheral area of the corneal surface can be actually examined and measured to determine the nature and extent of such refractive errors as may be present, and for diagnostic and other purposes. Such means, according to the present invention, functions to deflect the light rays passing from the objects on the mire-boxes to the corneal surface under examination, so that the images of these objects will be reflected either from the center or polar area of the corneal surface, or from the outer peripheral area thereof, as may be desired.

Preferably and as shown in the present instance, a pair of prisms 15 and 16 is provided and means is also provided for mounting these prisms appropriately in front of the respective mire boxes, so that these prisms will be located at the proper distance in front of the mire-boxes and may occupy a suitable angular relation, and also the prisms may be mounted with their bases outermost for examination and measurement of the center or polar area of the corneal surface, and they may be reversed so that their bases are adjacent for examination and measurement of the outer peripheral area of the corneal surface. Different means may be provided for mounting the prisms in front of the mire-boxes. Preferably and as shown in the present instance, supports which may consist of bars 17 are secured to the top and bottom of each mire-box and project a suitable distance beyond the face thereof to provide a rack to receive the respective prism, each prism, when in use, being mounted in upright or edgewise position between the upper and lower supports. Any suitable means may be provided for suitably securing or attaching the prisms to the respective supports. For example, the upper and lower edge of each prism may be equipped with a rail 18 which may be cemented or otherwise suitably secured thereto, and clamps 19 may be provided for securing each prism in different adjusted relations to the supports 17. In order to enable each prism to be removed from the supports and reversed and to also enable each prism to be adjusted in a direction forwardly and rearwardly of the front face of the mire-box, as well as angularly in relation thereto, each supporting bar 17 may be provided with a longitudinal slot 20 and each clamp may embody a screw 21 which is attached to the respective rail 18 and extends through the respective slot 20 in the supporting bar and is provided with a clamping nut 22. If desired, each screw 21 may operate longitudinally in a slot 23 formed in the respective rail 17 on the prism, so that the prism may be set in different angular relations relatively to the supporting bars 17.

The prism mounting described enables prisms to be mounted between the respective upper and lower supporting bars, either with their apices or their bases directed inwardly, the prisms may be adjusted to the proper distance in front of the respective mire-boxes, and also the prisms may be set in different angular positions in front of the mire-boxes, tightening of the clamping devices holding the prisms in adjusted position. Where, as in the present instance, the mire-boxes are adapted to be brought together, so that their proximate edges are in touch, as is illustrated in Figure 5, the apical edges of the prisms may be provided with recesses, as indicated at 15ª and 16ª in Figure 4, to accommodate the iconoscope 9. In using an instrument of the kind herein described and embodying the present invention, the prisms 15 and 16 are mounted in front of the respective mire-boxes with their bases arranged outwardly or toward the outer ends of the mire-boxes, as is shown in Figure 5, when the center or polar area of the corneal surface is to be examined and measured. The light rays from the luminous front faces of the mire-boxes will then be deflected by the respective prisms, so that the images of the objects on the front faces of the mire-boxes will be reflected from the center or polar area of the corneal surface, so that this center or polar area of the corneal surface can be actually examined and measurements made to determine the extent of such refractive errors as may be present. When it is desired to examine or measure the outer peripheral area of the corneal surface, the prisms are reversed; that is to say, they are placed in their supports in front of the respective mire-boxes, so that their bases are adjacent to one another, substantially as is shown in Figure 2. With the prisms in this position, the light rays passing from the luminous front faces of the mire-boxes will be deflected, so that the images of the objects on the front faces of the mire-boxes will be reflected from the outer peripheral area of the corneal surface, and hence this outer peripheral area of the corneal surface can be actually examined and measurements made to determine the extent of such refractive errors as may be present.

It will be understood that the prisms and their adjuncts may either be constructed as regular parts of the mire boxes or they may be detachable relatively to the mire boxes, as shown, so that the instrument may be operated either with or without the prisms.

I claim as my invention:—

1. In an instrument of the class described, the combination of mire-boxes, an ophthalmostat located in front thereof, and means located between the respective mire-boxes and the ophthalmostat for deflecting the light rays passing from the mire-boxes to the corneal surface of the eye under examination.

2. In an instrument of the class described embodying a pair of mire-boxes and an ophthalmostat for the positioning of an eye under examination relatively thereto, a pair of prisms, and means for mounting such prisms in front of the respective mire-boxes.

3. In an instrument of the class described embodying a pair of mire-boxes and an ophthalmostat in front thereof, a pair of prisms and means for mounting said prisms in front of the respective mire-boxes either with their apical edges or their bases toward one another.

4. In an instrument of the class described embodying a pair of mire-boxes and an ophthalmostat in front thereof, supports projecting beyond the fronts of the mire-boxes, and prisms adapted to be reversibly mounted on said supports with their apical edges or their bases toward one another.

5. In an instrument of the class described embodying a pair of mire-boxes and an ophthalmostat in front thereof, supports projecting forwardly beyond the fronts of the respective mire-boxes, and prisms adapted to be mounted on said supports in different angular relations to the fronts of the respective mire-boxes.

6. In an instrument of the class described embodying a pair of mire-boxes adjustable relatively toward and from one another and capable of having their proximate edges brought into touch, an iconoscope located between the mire-boxes, and an ophthalmostat in front of the mire-boxes, a pair of prisms, and means for mounting such prisms in front of the respective mire-boxes, the apical edges of the prisms being recessed to accommodate the iconoscope between them.

In testimony whereof I affix my signature.

BENJAMIN E. BRIERTON.

Witnesses:
A. J. Osow,
RACHEL PACELEY.